Oct. 5, 1971 T. C. ZWIEP ET AL 3,609,797
BONE HOLDING MECHANISM
Filed April 28, 1969 2 Sheets-Sheet 1
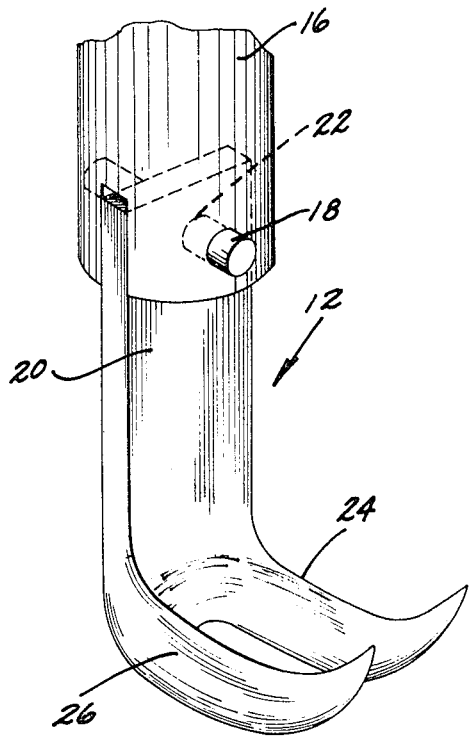
FIG. I.
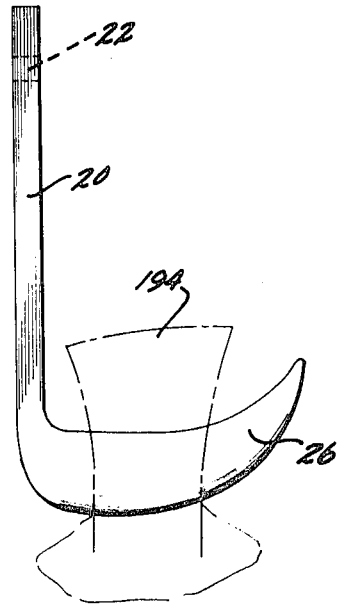
FIG. 2.
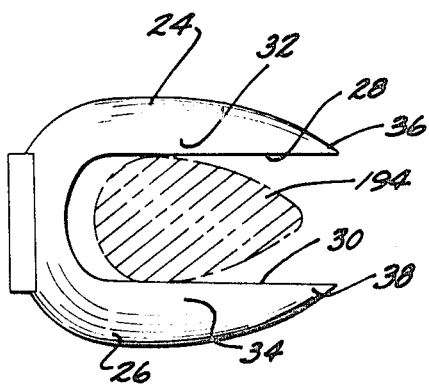
FIG. 3.
INVENTORS
THEODORE C. ZWIEP
FERDINAND WEITS
BY
Price, Heneveld
Huizenga & Cooper
ATTORNEYS

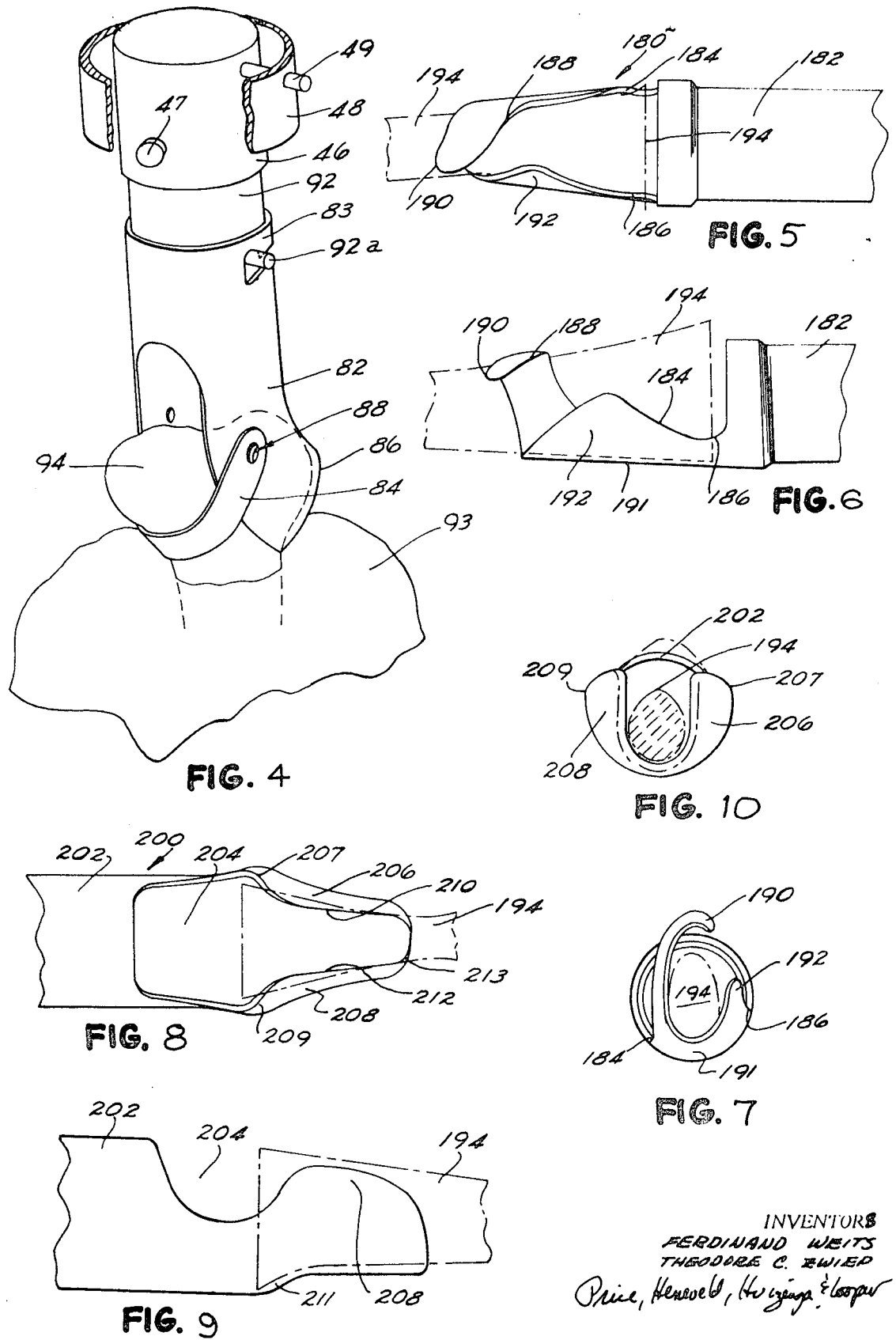

United States Patent Office 3,609,797
Patented Oct. 5, 1971

3,609,797
BONE HOLDING MECHANISM
Theodore C. Zwiep, Grand Rapids, and Ferdinand Weits, Holland, Mich., assignors to Prince Corporation, Holland, Mich.
Continuation-in-part of application Ser. No. 720,052, Apr. 10, 1968, now Patent No. 3,457,586, dated July 29, 1969. This application Apr. 28, 1969, Ser. No. 819,813
Int. Cl. A22c 17/02
U.S. Cl. 17—1 G    5 Claims

ABSTRACT OF THE DISCLOSURE

This disclosure relates to a bone holding chuck for supporting a bone by an end thereof while stripping meat from the bone. The chuck has a body with side wall means spaced so as to permit insertion of a bone therebetween at a narrow portion of the bone. The side wall means are so shaped so as to prevent rotation of the bone within the body. A seat is formed above the side wall means for an expanded end portion of the bone within the side wall means. The side wall means form an opening at the outer ends thereof to permit insertion of a narrow portion of the bone between the side wall means.

---

This application is a continuation-in-part of applicant's prior application Ser. No. 720,052, filed Apr. 10, 1968, now Pat. No. 3,457,586, issued July 29, 1969.

This invention relates to a bone holding chuck. In one of its aspects, the invention relates to a bone holding chuck formed so as to support the end of a bone for use during a meat stripping operation wherein the chuck is formed so as to use the bone geometry to restrain the bone against longitudinal movement and prevent rotational movement of the bone about a longitudinal axis.

Massengill, 2,857,619, 2,893,051, and 2,932,060 disclose a process of stripping meat from a bone wherein the bone is pulled longitudinally while holding the meat against a restricted variable opening which scrapes the meat from the bone. The bone is held by clamping jaws which squeeze the bone tighter as more force is used to pull the bone in a longitudinal direction. The clamping often causes crushing of the bone.

In our copending application, Ser. No. 720,052, filed Apr. 10, 1968, now Pat. No.3,457,586, issued July 29, 1969, there is disclosed and claimed an apparatus for removing meat from bones. A stripping cone containing dull edged plow blades rotate about the bone and are urged against the bone while the stripping cone is moved longitudinally of the bone to plow the meat intact away from the bone. The bone is preferably pendously hung so that the bone can center itself within the stripping cone.

By various aspects of this invention one or more of the following, or other, objects can be obtained.

It is an object of this invention to provide a bone holding and gripping chuck to support the end of a bone while the meat is being stripped therefrom wherein the bone is firmly restrained from longitudinal movement and rotational movement about its longitudinal axis by using bone geometry whereby crushing of the bone due to excessive force is prevented.

It is a further object of this invention to provide a bone supporting chuck wherein the contour of the bone is used to prevent longitudinal rotational movement of the bone within the chuck wherein the chuck can be used for many different size bones.

It is a further object of this invention to provide a bone holding chuck of one piece construction adapted to use the contour of the bone to hold the bone against longitudinal force and against a torque about a longitudinal axis of the bone.

It is yet another object of this invention to provide a bone holding chuck for supporting bones in a meat stripping operation wherein the bones are quickly and easily loaded into the chuck and removed from the chuck following the meat stripping operation.

Other aspects, objects, and the several advantages of this invention are apparent to one skilled in the art from a study of this disclosure, the drawings, and the appended claims.

According to the invention, there is provided a bone holding chuck for holding the expanded end portion of a bone while meat is being removed therefrom. The chuck has wedging means adapted to bear against an expanded end portion of the bone such that the bone is restricted from relative longitudinal movement away from the chuck when positioned in the chuck. The wedging surface has means for preventing relative rotation between the chuck and the bone, at least when longitudinal force is applied between the bone and the chuck. Means are also provided for permitting the insertion and removal of the bone into the chuck.

The invention will now be described with reference to the accompanying drawings in which:

FIG. 1 is a perspective view of a first embodiment of the invention;

FIG. 2 is a side elevational view of the first embodiment of the invention showing a bone in phantom lines;

FIG. 3 is a top view of the bone holding chuck illustrated in FIGS. 1 and 2 with a bone held thereby being illustrated in phantom lines;

FIG. 4 is a perspective view of a second embodiment of the invention;

FIG. 5 is a plan view of a third embodiment of the invention;

FIG. 6 is a side view of the third embodiment shown in FIG. 1;

FIG. 7 is an end view of the third embodiment illustrated in FIGS. 5 and 6;

FIG. 8 is a plan view of a fourth embodiment of the invention with the bone illustrated in phantom lines;

FIG. 9 is a side view of the fourth embodiment shown in FIG. 8; and

FIG. 10 is an end view of the embodiment shown in FIGS. 8 and 9.

Referring now to FIGS. 1, 2, and 3, there is shown a bone holding chuck 12 supported for lateral swinging movement by a support member 16 on a pin 18. A vertical bar 20 has a hole 22 for receiving the pin 18 at an upper end thereof and has arms 24 and 26 extending outwardly therefrom at a bottom portion thereof. The arms 24 and 26 have parallel side walls 28 and 30 and have upwardly and outwardly sloping upper sides 32 and 34 at the inner portions thereof. The ends 36 and 38 of arms 24 and 26 respectfully are pointed upwardly to retain the bone on the arms as the bone is pulled downwardly and rotated.

As illustrated in phantom lines in the FIGS. 2 and 3, a tibia bone 194 has an expanded end portion and a portion of reduced diameter spaced from the expanded end. The reduced diameter portion is inserted between the parallel side walls 28 and 30. As the longitudinal force is applied downwardly to the bone 194, the expanded portion will rest on the upwardly and outwardly sloping portions 32 and 34 to thereby firmly hold the bone from longitudinal movement. When rotational force is applied to the bone, the oblong cross sectional shape of the bone will prevent the bone from rotating within the arms 24 and 26. The upturned pointed ends 36 and 38 prevent the bone from sliding out of the arms 24 and 26 during the meat stripping operation.

The arms 24 and 26 are of a length greater than the spacing therebetween so as to permit proper seating of the bone on the arms while preventing rotation of the bone while seated on the arms. Further, the arms 24 and 26 can be mounted on the vertical bar 20 so as to adjust the spacing between the arms. In other words, one or both arms can be attached to the bar 20 through a horizontal slide or pivot wherein the arms can be fixed in a plurality of differently spaced positions to accommodate a more divergent range of bone sizes.

The bone 194 is free to swing about a horizontal axis perpendicular to the arms 24 and 26. The mounting of the chuck 12 on the pin 18 permits swinging of the chuck and therefore swinging of the bone about a horizontal axis parallel to the arms 24 and 26. By this arrangement, the bone can swing horizontally and center itself within a stripping cone such as described in said copending Ser. No. 720,052 during the meat stripping operation.

As is obvious from the foregoing description, the bone 194 is easily inserted and withdrawn from the bone holding chuck. The geometry of the bone is utilized to hold the same against longitudinal and rotational forces on the bone.

Referring now to FIG. 4, a bone supporting member 92 supports body 82 through pins 92a. The body 82 has two helical slots, each of which form a hook 83 which engages pins 92a. The member 92 is in turn supported by a universal joint so that it is laterally swingable on two mutually perpendicular axes to permit the bone to be centered within a meat plowing cone such as disclosed and claimed in our copending Ser. No. 720,052, filed Apr. 10, 1968, now Patent No. 3,457,586. The bone hanging body 82 has a closed end 86 which is bent laterally for engaging the femur bone ball end. The closed end slopes downwardly and inwardly to wedge the trochanter of a femur bone 94. The rounded head of the femur bone engages a strap 84 which is pinned by 88 to the shank hanging body 82. In this manner, the femur bone, supported by the ball joint, is held firmly, is vertically restricted from rotational movement, and is permitted to move horizontally to center itself within the supporting cone 56.

The universal joint comprises a hollow cylinder which supports member 92 through pin 47, and pipe 48 which supports cylinder 46 through pin 49. Pipe 48 is fixed to the end of bone supporting arm 50.

The femur bone is easily inserted into the chuck shown in FIG. 4 by rotating the strap upwardly, inserting the bone downwardly to seat the trochanter of the bone against closed end 86. The bone can be easily removed by pushing the bone upwardly into the chuck and following the reverse procedure, i.e. rotating the strap upwardly and removing the bone.

Referring now to FIGS. 5, 6, and 7, a tibia bone holding chuck 180 has a cylindrical shaft 182 which is cut away in part to form the holding means. A longitudinal base member 191 has a first upstanding side wall 184 and a second upstanding side wall 186. The first side wall 184 is helically shaped and has a rear helical edge 188 which ends in a sharpened tip 190. The second side wall 186 extends upwardly and inwardly from the cut away rear portions forming shoulder 192 which has a forwardly and downwardly sloping front edge. A tibia bone 194 is shown in phantom lines positioned within the chuck. The first and second side walls form an oval shape in cross section as seen in FIG. 7 to prevent twisting of the bone in a counterclockwise direction viewed with relation to FIG. 7. The forwardly and inwardly shaped side walls 184 and 186 wedge the end of the bone so as to prevent axial movement of the bone. The oval shape formed by the side walls restricts rotational movement of the bone in a counterclockwise direction around the longitudinal axis of the bone. An oblique slot is formed between the helical edge 188 and the forwardly sloping front edge of shoulder 192. The bone can be inserted into the chuck by tilting it so that the narrow portion of the bone is inserted between shoulder 192 and helical edge 188. The bone is then pushed into the central open portion and turned so that it is in the position as seen in FIGS. 5, 6, and 7. The chuck is primarily designed for operation of a deboning machine described and claimed in said copending Ser. No. 720,052, filed Apr. 10, 1968, wherein plow blades rotate in a direction opposite to the direction of helical arm 184. For a device in which the plow blades rotate in an opposite direction the helical arm would be shaped in the opposite direction. In other words, the direction of the helical arm will oppose the rotational direction of the plow blades.

Referring now to FIGS. 8, 9, and 10, a second tibia bone holding chuck is shown. The chuck 200 has a cylindrical shaft 202 having a central opening 204 and holding flanges 206 and 208. The holding flanges are bent inwardly at the top portion thereof and are tapered inwardly at the forward end 213. In order to prevent rotation of the bone within the chuck, the forward end 213 is U-shaped. Holding flanges 206 has an expanded rear portion 207 and a sharpened edge 210. Holding flange 206 has an expanded edge 209 and a sharpened forward edge 212. The bottom of the chuck is depressed at 211 to conform with the expanded end of the tibia bone. The bone 194 (shown in phantom lines) fits within the chuck between holding flanges 206 and 208. The sharpened edges 210 and 212 aid in removing the meat from the bone as the bone is inserted into the chuck. The tapered flanges 206 and 208 are so shaped as to hold the bone from longitudinal movement away from the chuck and the U-shaped cross section prevents rotational movement of the bone within the chuck about its longitudinal axis.

Both of the alternate chucks shown in FIGS. 5 through 10 are supported by a supporting arm in the meat stripping machine. Both of these chucks can be supported by a universal joint which will hold the chuck in a fixed vertical position and fixed so that it cannot rotate about a vertical axis, but permitting lateral movement of the bottom portion of the chuck so that the bone can center itself within the meat stripping cone. A suitable joint is illustrated in FIG. 4. The chucks 180 and 200 preferably have helical slots like body 82 so as to engage pins 92a of the universal joint.

All of the bone holding chucks make use of bone contour to hold the bone for the stripping operation. Each of the chucks is designed so that the force of the stripping cone, plowing the meat away from the bone, will be transmitted along the length of the bone. Thus, the holding means for the bone will not crush the bone because it is not dependent on the compressive force applied to the bone. It is also apparent that the bone chucks advantageously use the bone geometry to prevent relative rotation between the chuck and the bone so that compressive forces on the bone are eliminated.

Reasonable variation and modification are possible within the scope of the foregoing disclosure and drawings without departing from the spirit of the invention.

The embodiments of the invention in which an exclusive property or privilege is claimed are defined as follows:

1. A bone holding chuck for holding the expanded end portion of a bone while meat is being removed therefrom comprising a pair of horizontally extending arms spaced parallel to one another and in bone holding position being spaced to less than the dimension of said expanded end portion; said arms having their opposed inner sides sloped downwardly and inwardly to approximately follow the geometry of said expanded end portion whereby said expanded end portion when received between said arms is wedged therebetween and is restricted from longitudinal and rotational movement at least when a longitudinal force is applied between said bone and chuck.

2. A bone holding chuck according to claim 1 further comprising means permitting said bone to swing pendulously on a support to allow said bone to center itself during a meat stripping operation regardless of the shape of said bone.

3. A bone holding chuck according to claim 1 further comprising means for hanging said chuck so as to permit lateral swinging of a bone about two axes within said chuck.

4. A bone holding chuck according to claim 1 wherein the length of said arms is greater than the spacing between said arms.

5. A bone holding chuck according to claim 1 wherein a bar is provided for suspending said arms and chuck so as to permit swinging in a direction perpendicular to said arms.

References Cited

UNITED STATES PATENTS

| 2,642,619 | 6/1953 | Coad | 17—21 |
| 2,840,849 | 7/1958 | Bergstrom et al. | 17—1 G |
| 3,261,054 | 7/1966 | Kaplan et al. | 17—1 G |

FOREIGN PATENTS

| 68,036 | 11/1948 | Denmark | 17—1 G |

LUCIE H. LAUDENSLAGER, Primary Examiner

U.S. Cl. X.R.

17—44.2